Feb. 9, 1926.  
A. L. WILLCOX  
1,572,341  
TIME BOOK  
Filed May 4, 1923  
2 Sheets-Sheet 1

Fig. 1.

Inventor  
A. L. Willcox

Feb. 9, 1926.

A. L. WILLCOX 1,572,341

TIME BOOK

Filed May 4, 1923

Inventor
A. L. Willcox

Patented Feb. 9, 1926.

1,572,341

UNITED STATES PATENT OFFICE.

ARTHUR LYMAN WILLCOX, OF SAVANNAH, GEORGIA.

TIME BOOK.

Application filed May 4, 1923. Serial No. 636,688.

*To all whom it may concern:*

Be it known that I, ARTHUR LYMAN WILLCOX, a citizen of the United States, and resident of Savannah, in the county of Chatham and State of Georgia, have invented certain new and useful Improvements in Time Books, of which the following is a specification.

This invention relates to certain new and useful improvements in account books for pay roll purposes and is particularly designed for the use of merchants, building constructors and other employers of diversified labor.

One of the purposes of the invention is to provide means for recording time or different periods of time, and the kind or kinds of work that each and all employees may be engaged in during the various days, the total number of hours worked during any given or suitable period, the wage rates, the aggregate amount of the individual wage, the names of the employees, the employee's time book number, and a space for remarks in connection with the employee's record.

A further purpose of the invention is to provide an account book containing one or more sheets of extra large size, constituting key sheets carrying suitable information controlling or relating to the entries to be made on the record sheets, such, for example, as a schedule of the various classifications of work; the various symbols representing the different work classifications and one or more wage tables covering different time periods. The key sheet is normally folded to substantially the dimension of the record sheets so as to lie within and be protected by the covers of the book, the information contained on the key sheets being positioned adjacent the marginal portions thereof, so as to be exposed to view beyond the corresponding marginal portions of the record sheets when the key sheet is unfolded to its full dimensions.

Other purposes and advantages of the invention, not specifically included in the foregoing will become apparent from the following detailed description and accompanying drawings, in which—

Fig. 1 is a view of an account book in open position illustrating the matter contained on the exposed record sheets and one side of the key sheet, the latter being opened to its full dimension.

Fig. 2 is a view similar to Fig. 1 but showing the pages turned to expose the matter on the reverse side of the key sheet.

In accordance with my invention, as herein disclosed, the surfaces 5 and 6 of adjacent pages of the account book 7 are ruled to conjointly provide a single record sheet covering, preferably, a period of one week, the ruled lines being arranged to provide a number column 8, a name column 9, a series of double daily entry columns 10, a total time column 11, a wage rate column 12, a total wage or amount column 13, and a remarks column 14. The columns 8, 9 and 11 to 14, inclusive, are provided at the top with suitable headings 15, indicative of the use of such columns for the purposes specified.

Each of the daily entry columns 10 is provided at the top with a title space 16, which is subdivided to provide an upper space 17 extending the full width of the said double column and having printed therein, the day of the week of which the said column is representative. Below the space 17 there is provided two smaller spaces designated 18 and 19, respectively. The space 18 being at the left hand side of the column and containing the letter T indicating that this side of the column is to be used for entering the hours of labor performed by the employees for that particular day. The space 19 at the right hand side of the total column has the letter S printed therein to indicate that this side of the column is to be used for recording symbols representing the particular classification of work performed.

In the use of this book, the time book number of each employee is placed in one of the spaces provided for this purpose in the column 8 and opposite the employee's name appearing in the column 9. The hours of labor performed each day by the employee is entered in the left hand side of the proper column or columns 10, a suitable symbol or symbols being marked at the same time in the right hand side of the column or columns 10 to identify the particular type of work performed. The total time worked by each employee is entered at the end of the week in the proper space in the total time column 11 and the wage rate or rates entered in the column 12. The aggregate or total amount of individual wages is entered in the column 13, and if there are any reductions or other notes to which attention is to be directed in connection with one or more employees, entry relevant thereto is made in the remarks column 14.

In order to eliminate to a certain extent the factor of memory when entering work identifying symbols, wage rates, or other data on the record sheets, I provide a key sheet 20 of extra large size and the portions of said key sheet which, in the extended position shown, project beyond the margins of the record sheets, are ruled on each side to provide for symbol columns 21, a plurality of classification columns 22 and one or more wage tables 23 covering different periods of time. The classification columns 22 are utilized for listing the various kinds of labor which the employees may be called upon to perform and the symbol columns 21 are utilized for listing the various symbols representative of the different work or labor classifications. The wage tables 23 may be made up in any manner that will aid the timekeeper in making the necessary entries and computation regarding accounts existing between the employer and employees.

As herein shown, the key sheet is foldable along the dotted lines 24 to substantially the dimension of the record sheets so as to lie within and be protected by the covers of the book.

Having thus fully described my invention, it will be understood that I do not limit myself to the exact showing made herein, but reserve the right to resort to such changes that come within the spirit and scope of the appended claim:

What I claim is:

A time book provided with a plurality of account sheets, the adjacent surfaces of each pair of sheets being ruled to conjointly provide a series of vertical columns including a number column, a name column, a series of double daily entry columns, a total time column, a wage rate column, a total wage or amount column, each of said double daily entry columns being subdivided to provide two rows of vertical spaces, the spaces of one of said rows being adapted for the reception of symbol indicia representative of particular kinds of work and the spaces of the remaining row being adapted for the reception of indicia indicating hours of labor performed, one of said sheets being made larger than the remaining sheets so as to project at its free marginal edges beyond the corresponding marginal edges of the remaining sheets, parts of the projecting portions of said larger sheet being ruled to provide a plurality of symbol columns adapted to contain an index of symbols to be entered on the account sheets and a plurality of classification columns each located alongside one of said symbol columns and adapted to contain an index of the entry information represented by said symbols, other parts of the projecting portions of said larger sheet being provided with a plurality of wage rate tables covering varying periods of time, said larger sheet being foldable along lines coinciding with the free marginal edges of the remaining sheets whereby said larger sheet may be conveniently reduced to the size of said remaining sheets for concealment between the covers of the book.

In testimony whereof I hereunto affix my signature.

ARTHUR LYMAN WILLCOX.